US012623261B2

(12) United States Patent
Davis-Johnston

(10) Patent No.: US 12,623,261 B2
(45) Date of Patent: May 12, 2026

(54) APPARATUS FOR CONTAINED DECONTAMINATION

(71) Applicant: Soletanche Freyssinet S.A.S., Rueil-Malmaison (FR)

(72) Inventor: Adrian Davis-Johnston, Rueil-Malmaison (FR)

(73) Assignee: Soletanche Freyssinet S.A.S., Rueil-Malmaison (FR)

(*) Notice: Subject to any disclaimer, the term of this patent is extended or adjusted under 35 U.S.C. 154(b) by 351 days.

(21) Appl. No.: 18/275,742

(22) PCT Filed: Feb. 1, 2022

(86) PCT No.: PCT/EP2022/052266

§ 371 (c)(1),
(2) Date: Aug. 3, 2023

(87) PCT Pub. No.: WO2022/167386

PCT Pub. Date: Aug. 11, 2022

(65) Prior Publication Data

US 2024/0091830 A1 Mar. 21, 2024

(30) Foreign Application Priority Data

Feb. 4, 2021 (GB) ...................................... 2101569

(51) Int. Cl.
*B08B 15/02* (2006.01)
*B08B 3/02* (2006.01)
(Continued)

(52) U.S. Cl.
CPC .............. *B08B 15/02* (2013.01); *B08B 3/024* (2013.01); *B24C 1/003* (2013.01); *B24C 3/32* (2013.01);
(Continued)

(58) Field of Classification Search
CPC ........... G21F 9/001; B24C 1/003; B24C 3/32; B08B 3/024; B08B 15/02; B08B 2203/0229; B28D 1/00
See application file for complete search history.

(56) References Cited

U.S. PATENT DOCUMENTS 4,436,694 A * 3/1984 Vassalotti ............... B05B 13/00 376/310
4,470,952 A * 9/1984 Vassalotti ............... G21F 9/001 376/310
(Continued)

FOREIGN PATENT DOCUMENTS

CA 2818348 A1 * 5/2012 ............... A61L 9/14
EP 0135978 A2 4/1985
(Continued)

OTHER PUBLICATIONS

Machine Translation of JP 2014066610A to Yoshizawa et al., Apr. 2014. (Year: 2014).*
(Continued)

*Primary Examiner* — Benjamin L Osterhout
(74) *Attorney, Agent, or Firm* — MARSHALL, GERSTEIN & BORUN LLP

(57) ABSTRACT

A decontamination apparatus for decontaminating an external surface is provided. The decontamination apparatus has a moveable platform and a containment structure mounted on the moveable platform. The containment structure has at least one aperture and a respective contact surface arranged around the perimeter of the aperture. The contact surface is arranged to make contact with the external surface to define a working volume, when the containment structure is positioned proximal to the external surface. The decontamination apparatus includes a decontamination device arranged to decontaminate the external surface. The decontamination device is arranged within the working volume and arranged
(Continued)

to access the external surface through the at least one aperture. There is also a vacuum system for generating a partial vacuum in the containment structure to apply a suction force to the external surface.

19 Claims, 5 Drawing Sheets

(51) Int. Cl.

| | |
|---|---|
| ***B24C 1/00*** | (2006.01) |
| ***B24C 3/32*** | (2006.01) |
| *B28D 1/00* | (2006.01) |
| *G21F 9/00* | (2006.01) |

(52) U.S. Cl.

CPC ........ *B08B 2203/0229* (2013.01); *B28D 1/00* (2013.01); *G21F 9/001* (2013.01)

(56) References Cited

U.S. PATENT DOCUMENTS

| | | | | | |
|---|---|---|---|---|---|
| 5,178,823 | A | * | 1/1993 | Hughes | G21F 9/001 376/310 |
| 5,601,479 | A | * | 2/1997 | Santos | B24C 3/065 451/87 |
| 5,635,143 | A | | 6/1997 | White et al. | |
| 5,679,172 | A | | 10/1997 | Pritt | |
| 6,132,356 | A | * | 10/2000 | Schabdach | B08B 15/02 405/303 |
| 7,097,717 | B2 | * | 8/2006 | Jung | G21F 9/001 239/290 |
| 2003/0090174 | A1 | | 5/2003 | Ryder | |
| 2015/0255180 | A1 | | 9/2015 | Paschal et al. | |
| 2016/0051715 | A1 | * | 2/2016 | Brown | A61L 2/22 422/292 |
| 2016/0175902 | A1 | * | 6/2016 | Spekschate | B08B 9/093 134/110 |
| 2016/0207077 | A1 | * | 7/2016 | Farmer | G01N 1/04 |

FOREIGN PATENT DOCUMENTS

| | | | | | |
|---|---|---|---|---|---|
| EP | 2304425 | A1 | | 4/2011 | |
| EP | 2305425 | A1 | | 4/2011 | |
| EP | 2306467 | A1 | | 4/2011 | |
| EP | 4424428 | A1 | * | 9/2024 | A61L 2/22 |
| GB | 2242778 | A | * | 10/1991 | G21F 9/005 |
| GB | 2301221 | A | | 11/1996 | |
| JP | H11142591 | A | | 5/1999 | |
| JP | 2013224844 | A | | 10/2013 | |
| JP | 2014066610 | A | | 4/2014 | |
| JP | 2015110263 | A | | 6/2015 | |
| JP | 2022114308 | A | | 8/2022 | |
| KR | 101407706 | B1 | * | 6/2014 | G21F 9/008 |
| WO | WO-02058742 | A1 | * | 8/2002 | A61L 2/0011 |

OTHER PUBLICATIONS

Office Action, Japanese Application No. 2023-547580, dated Jul. 4, 2025.

International Search Report and Written Opinion, International Application No. PCT/EP2022/052266, mailed May 27, 2022.

Search Report, British Application No. 2101569.8, dated Jul. 1, 2021.

* cited by examiner

APPARATUS FOR CONTAINED DECONTAMINATION

FIELD OF THE DISCLOSURE

This invention relates to an apparatus for the contained removal of contaminated material from a surface of a structure.

BACKGROUND

Contamination of materials occurs because of the physical or chemical transfer of materials (contaminants) onto surfaces where it is unwanted. Some contamination may be strongly adhered to the surface and thus difficult to remove, through being absorbed by the porous structure of the material or by chemically reacting with the material, e.g. corrosion. The removal of such "fixed contamination" by intensive decontamination operations may result in contaminants becoming air-borne, either as particulate, gas or aerosol.

The decontamination of structures by removing contaminated material from a surface, e.g. walls, floors or ceilings in buildings, is a frequent task in remediation scenarios, particularly when decommissioning nuclear installations. The presence of contaminating (e.g. radioactive) materials can result in complications with the remediation or demolition of a structure and the disposal of the resulting waste.

Many industries need to contain or control the release of toxic or hazardous materials during industrial decontamination processes, such as those involving radioactive materials, toxic chemicals, asbestos, biologically active materials and hazardous waste. This is particularly so during more intensive decontamination operations, such as high pressure water jetting or scabbling, which may cause hazardous aerosol production (e.g. in the form of dust or droplets). The nature of current decontamination operations, could result in (re-)contamination of the surrounding environment and, particularly when they involve toxic or hazardous materials, may mean that it is dangerous for human operators to be present.

SUMMARY

It is an aim of the present invention to provide an improved apparatus for such removal of contaminants and/or material comprising contaminants from surfaces comprising physical, chemical or biological contaminants.

From a first aspect, the invention provides a decontamination apparatus for decontaminating an external surface comprising:

a moveable platform;

a containment structure mounted on the moveable platform;

wherein the containment structure comprises:

at least one aperture; and a respective contact surface arranged around the perimeter of the at least one aperture, wherein the contact surface is arranged to form a barrier with the external surface to define a working volume, when the containment structure is positioned proximal to an external surface; and a decontamination device arranged to decontaminate the external surface, wherein the decontamination device is arranged within the working volume and arranged to access the external surface through the at least one aperture.

The present invention provides a decontamination apparatus for decontaminating an external surface. The apparatus has a containment structure mounted on a moveable platform. The containment structure has one or more apertures (e.g. defined therein) and each aperture has a respective contact surface around the aperture. The external surface is so-called because it is a surface (to be decontaminated) external to the containment structure—e.g. a wall or floor or ceiling of a contaminated structure or building.

When the contact surface is positioned next to the external surface, it can be put in contact with the external surface to form a barrier (e.g. a seal) between the external surface and the containment structure. This has the effect of forming a (e.g. sealed) working volume, defined by the portion of the external surface within the aperture defined by the contact surface and the containment structure.

The decontamination device works within the (e.g. sealed) working volume to decontaminate the external surface. Typically, decontamination involves removing contaminants or material comprising contaminants from the external surface. It will be appreciated that the containment structure provides containment (i.e. inside the containment structure) for any waste (including, e.g., aerosols) that results from the decontamination process.

Thus it will be seen that, in accordance with at least preferred embodiments of the invention, by decontaminating the external surface within the (e.g. sealed) working volume, a large proportion (and preferably substantially all) of the waste generated by the decontamination process (e.g. contaminants or contaminated material removed from the external surface) may be contained within the containment structure. This helps to achieve safe decontamination of an external surface within a (e.g. sealed) volume without releasing contaminated material or contaminants into the surrounding environment, where they may contaminate the environment.

Furthermore, by containing the toxic or hazardous contaminated material within the containment structure, any humans who may be in the area (e.g. outside the (e.g. sealed) working volume) may be substantially prevented from coming into contact with the contaminated material once it has been removed from the external surface.

For example, in conventional decontamination apparatus, it is possible that aerosols resulting from the decontamination process could be released. In some cases, there is a danger that the aerosols may be inhaled. When the contaminant comprises asbestos, radioactive material or any other toxic or hazardous material, inhalation may cause chronic or acute illness, or even death. Therefore, some embodiments in accordance with the invention also help to prevent the possibility of inhalation of such materials by providing a barrier (e.g. seal) between the decontamination device and the surrounding environment.

The decontamination device may itself, in addition to the barrier around the at least one aperture of the containment structure, comprise a barrier, e.g. which helps to prevent the release of waste created by the removal of contaminants. This is considered to be novel and inventive in its own right and, thus, from a second aspect, the invention provides a decontamination apparatus for decontaminating an external surface comprising:

a containment structure, the containment structure comprising:
at least one outer aperture; and
a respective outer contact surface arranged around the perimeter of the at least one outer aperture;
wherein the outer contact surface is arranged to form an outer barrier with the external surface to define a working volume, when the containment structure is positioned proximal to an external surface; and
a decontamination device arranged to decontaminate the external surface, wherein the decontamination device is arranged within the working volume and arranged to access the external surface through the outer aperture,
wherein the decontamination device comprises an inner aperture and an inner contact surface arranged around the perimeter of the inner aperture,
wherein the inner contact surface is arranged to form an inner barrier between the external surface and the decontamination device,
wherein the decontamination device comprises a decontamination tool, and
wherein the decontamination tool is arranged to access the external surface through the inner aperture.

Thus it will be seen that, in accordance with the second aspect of the invention, by decontaminating the external surface within a (e.g. sealed) working volume, and with the decontamination device having an inner barrier (e.g. inner seal) (e.g. directly around the area of the external surface on which the decontamination tool is working), waste (e.g. contaminants) that may not be contained within the inner barrier may be contained within the outer barrier (e.g. outer seal).

It will be appreciated that the inner barrier (e.g. inner seal) is within (surrounded by) the outer barrier (e.g. outer seal), owing to the decontamination device being located within the (e.g. sealed) working volume. Having both an inner barrier and an outer barrier helps to ensure that decontamination of an external surface can be safely achieved within a (e.g. sealed) volume—e.g. even if one of the two barriers (e.g. seals) leaks or fails. Having an inner barrier (e.g. seal) may further help reduce contamination of the interior of the (e.g. sealed) working volume and containment structure by reducing the amount of waste released into those areas (outside of the inner barrier).

In embodiments comprising both an inner barrier and an outer barrier, the inner barrier may (and preferably does) contain the majority of waste created during decontamination of the external surface. However, there may be some waste (e.g. dust or aerosols) that is not contained by the inner barrier. Therefore, the outer barrier acts as a secondary barrier to contain and/or remove any leftover waste not contained and/or removed by the inner barrier. The waste may be removed via suction and, e.g., transported into the main body of the containment structure/a waste module in the main body of the containment structure.

In a set of embodiments in accordance with the second aspect of the invention, the decontamination apparatus may further comprise a moveable platform upon which the containment structure is mounted.

It will be appreciated by those skilled in the art that the second aspect and embodiments of the present invention can, and preferably do, include, as appropriate, any one or more or all of the preferred and optional features described herein. For example, it will appreciated that the outer aperture of the second aspect could be the aperture of the first aspect. Similarly the outer barrier and outer contact surface of the second aspect could be the barrier and contact surface of the first aspect, respectively.

The external surface may be any surface that may contain contaminants. In a set of embodiments, the external surface to be decontaminated is a wall or floor of a building or site. For example, the external surface may be the walls and/or floor of a spent fuel pond. In this case, the contaminant (in the walls and/or floor of the spent fuel pond) may be radioactive.

The external surface may comprise any material. In a set of preferred embodiments, the external surface comprises concrete, e.g. contaminated with radioactive material (e.g. radionuclides). The external surface may be located indoors or outdoors. At least preferred embodiments of the invention help to improve the safety of decontamination procedures, especially when performed indoors where aerosols may remain in the local environment for longer, e.g. owing to lack of ventilation and in enclosed spaces.

In a set of embodiments, the containment structure comprises a main body connected to the contact surface. The contact surface may be arranged to be deployable—e.g. the contact surface may be arranged to be deployed in a direction away from the main body of the containment structure and towards the external surface to be decontaminated.

The main body of the containment structure may be any suitable or desired shape and size. In a preferred set of embodiments, the main body of the containment structure is at least 1 m high, 2 m wide, and 2 m deep.

Preferably the main body of the containment structure comprises one or more walls and a roof. The containment structure may be erected or built, and then the external surface to be decontaminated may be placed proximal to the containment structure. Preferably the outer containment structure is erected or built near to the external surface to be decontaminated—e.g. on top of the or a moveable platform. This allows an external surface in an industrial environment that has been contaminated to be decontaminated in situ, which helps to reduce the risk of toxic or hazardous material being uncontrollably released from the structure or site. The main body of the containment structure may comprise a floor or the base of the main body of the containment structure may be open, e.g. such that the moveable platform forms a floor of the working volume.

The main body of the containment structure may be modular—i.e. comprising separate modules. Therefore, in a set of embodiments the main body of the containment structure comprises a modular structure, e.g. such as the Applicant's ModuCon™ system, as described in GB 2 376 701 A. Such a modular structure helps to provide a versatile, easily transportable and simple to use system that may allow an outer containment structure of any suitable and desired size to be assembled quickly and easily.

Thus, preferably the main body of the containment structure comprises prefabricated components (e.g. panels such as walls, a roof and/or a floor), which are then joined together (e.g. in the vicinity of the external surface to be decontaminated) to form the main body of the containment structure. Such a modular structure may then allow the containment structure to be decontaminated and/or disassembled itself, e.g. once the external surface has been decontaminated. Therefore, in a set of embodiments, the containment structure is a temporary containment structure.

It will be appreciated that the decontamination apparatus may itself need to be decontaminated before use in a new environment. Therefore, in a set of embodiments the interior and/or exterior surfaces (e.g. panels) of the containment structure comprise (e.g. are coated with) a removable coating. This helps to facilitate decontamination of the containment structure. The removable coating may be applied via brushing, rolling or spraying. In a set of embodiments, therefore, contaminants that happen to be on the containment structure may be trapped by the coating and subsequently removed by stripping the coating.

Preferably the (e.g. components of the) main body of the containment structure comprise (e.g. fire retardant) glass reinforced plastic.

Preferably the components of the containment structure are sealed together to help to prevent the escape of any contaminants from inside the containment structure. In one embodiment (e.g. when the system is used to decontaminate the external surface) the containment structure or one of its modules comprises shielding (e.g. for radioactivity). This helps to contain substantially all toxic or hazardous materials and emissions within the containment structure (or the modules thereof).

In one embodiment the containment structure comprises one or more (e.g. all) of: windows, one or more power supplies, lighting, ventilation and filtration systems. The ventilation and/or filtration systems help to contain any toxic or hazardous materials within the containment structure, e.g. by trapping such materials in the ventilation and/or filtration systems.

The containment structure may comprise a module for waste collection—e.g. for receiving and/or storing waste produced by the decontamination process. In a set of embodiments, the containment structure comprises a hatch or door to allow access to the waste produced by the decontamination process—e.g. for enabling removal of the contaminated waste. Preferably, the hatch or door is located on or in the main body of the containment structure.

The containment structure may be arranged to accommodate people inside the containment structure—e.g. for controlling the operation of the decontamination apparatus or for maintenance or repair of the decontamination apparatus. Therefore, in a set of embodiments, the (e.g. modular) main body of the containment structure may comprise a module for occupation by a human operator (a human-safe module)—e.g. a control room.

Such a module should be safe for the human operator, therefore, in a set of embodiments, the human-safe module comprises shielding. The shielding may be arranged to help to prevent aerosols or fumes from entering the human-safe module, and/or in the case of radiation-emitting contaminants the shielding comprises radiological shielding.

In a set of embodiments, the containment structure is arranged to be accessible by a worker in protective clothing, e.g. an air-fed suit. For example, the containment structure may comprise an accessible module (e.g. an airlock/changing-room) at one end of the main body of the containment structure. This may allow for a worker to perform manual operations within the structure to decontaminate the external surface (e.g. a human worker inside with a high pressure water jet or powerful high pressure cleaner).

The at least one aperture of the containment structure is defined by contact surface, which is arranged around the perimeter of the at least one aperture. Preferably, the contact surface is substantially continuous around the aperture. This helps to provide a substantially continuous barrier (e.g. seal) around the aperture between the external surface and the contact surface of the containment structure.

The contact surface may be arranged to provide an aperture of any suitable or desired shape or size. In a preferred set of embodiments, the aperture is substantially rectangular. In a preferred set of embodiments, the maximum dimension of the aperture in the plane of the aperture is between 1 m and 3 m.

The contact surface may be stiff. In a preferred set of embodiments the contact surface is flexible. The flexible contact surface may, optionally, be arranged to change shape, e.g. for forming a barrier (e.g. seal) with external surfaces that are not flat (e.g. comprising corners or curves). The contact surface may comprise any suitable material; preferably, the contact surface comprises a polymer material—e.g. synthetic rubber.

In a preferred set of embodiments the containment structure comprises a hood that extends (e.g. from the main body of the containment structure) towards the contact surface defining the aperture. The hood preferably extends between an open portion of the (e.g. main body of the) containment structure and the contact surface defining the aperture.

The hood may be stiff. In a preferred set of embodiments the hood is flexible. The hood may, optionally, be arranged to change shape, e.g. for forming a barrier (e.g. seal) with external surfaces that are not flat (e.g. comprising corners or curves). The hood may comprise any suitable material; preferably, the hood comprises a polymer material—e.g. rubber—e.g. the same material as the contact surface.

The hood may be mechanically deployable—e.g. away from the main body of the containment structure and toward the external surface to be decontaminated. The (e.g. cross-sectional) shape of the hood may be any suitable and desired shape. In a set of embodiments, the hood has a substantially constant cross section (e.g. in a plane parallel to the plan of the contact surface), e.g. the hood is tunnel-shaped. Preferably the cross-section of the hood (e.g. in a plane parallel to the plan of the contact surface) is substantially rectangular (e.g. with rounded corners).

In a preferred set of embodiments, the hood comprises one or more walls having a concertina shape. The concertina shape helps to provide flexibility to the hood.

The concertina-shaped hood may have (e.g. be retracted into) a folded configuration when the apparatus is not in use. This allows the apparatus to be more compact when not in use. When in use, the hood may be arranged to at least partially (e.g. fully) unfold (i.e. be deployed) toward the external surface. The flexibility accorded by a concertina-shaped hood helps a barrier (e.g. seal) to be formed when the external surface to be decontaminated is not perfectly flat (e.g. curved) or not in a plane parallel to the plane of the aperture (at least when the hood is retracted).

In a set of embodiments, the hood comprises a flexible (e.g. concertina-shaped) hood for decontaminating a first external surface in a first plane and a second external surface in a second plane, e.g. wherein the first plane is not parallel to the second plane, e.g. wherein the first plane is orthogonal to the second plane. Thus preferably the hood is arranged to rotate the contact surface between a first plane and a second plane, wherein the first plane is not parallel to the second plane.

Having a flexible hood extending between the (e.g. main body of the) containment structure and the contact surface (defining the aperture) allows the contact surface to be moved in a range of directions relative to the (e.g. main body of the) containment structure. Therefore, a barrier (e.g. seal) may be formed upon a range of external surfaces (at a range of angles relative to the main body of the containment structure) proximal to the decontamination apparatus.

In such a set of embodiments, after decontaminating the first surface, the (e.g. concertina-shaped) hood may be arranged to bend (via folding the flexible hood) so as to direct the contact surface toward the second surface. During decontamination of a spent fuel pond, for example, it may be desirable to decontaminate both the walls and the floor using the same hood (and, e.g., decontamination tool), which is helped by this flexibility. In another example, for decontamination of an interior of a room, it may be necessary to decontaminate the walls, floor and ceiling.

The barrier (e.g. seal) between the contact surface and the external surface may be formed in any suitable and desired manner. In a preferred set of embodiments the (e.g. contact surface of the) containment structure is arranged to provide a suction barrier (e.g. suction seal) of the contact surface on the external surface.

The (e.g. contact surface of the) containment structure may be arranged to provide a suction barrier (e.g. suction seal), e.g. by generating a pressure difference between at least part of the (e.g. sealed) working volume and the surrounding environment, in any suitable and desired way.

In a set of embodiments, the decontamination apparatus comprises a vacuum system for generating a partial vacuum in the (e.g. working volume of the) containment structure, for applying a suction force to the external surface. This is considered to be novel and inventive in its own right and, thus, from a third aspect, the invention provides a decontamination apparatus for decontaminating an external surface comprising:

- a moveable platform;
- a containment structure mounted on the moveable platform;
  - wherein the containment structure comprises:
    - at least one aperture; and
    - a respective contact surface arranged around the perimeter of the at least one aperture;
      - wherein the contact surface is arranged to make contact with the external surface to define a working volume, when the containment structure is positioned proximal to an external surface;
- a decontamination device arranged to decontaminate the external surface, wherein the decontamination device is arranged within the working volume and arranged to access the external surface through the at least one aperture; and
- a vacuum system for generating a partial vacuum in the containment structure, to apply a suction force to the external surface.

Thus it will be seen that, in accordance with the third aspect of the invention, by decontaminating the external surface within a (e.g. sealed) working volume, and by having a vacuum system for providing a partial vacuum within the containment structure, a suction force may be applied on the external surface, e.g. when the contact surface makes contact with the external surface.

The suction force may provide a draw (an airflow, e.g. through the containment structure) for the waste produced by the decontamination of the external surface and/or a suction barrier between the contact surface and the external surface. A draw generated by the vacuum system may help to prevent the release of waste (e.g. solids, liquids and aerosols) created by the removal of contaminants (e.g. by drawing the waste away from the external surface into the containment structure). A suction barrier (e.g. suction seal) between the external surface and the contact surface (i.e. when they are in contact) may also help to prevent the release of waste (e.g. from being released into the surrounding environment external to the containment structure).

In some embodiments, a draw of air is generated by the vacuum system which takes air from the external environment, into the "working volume", e.g. through a heating, ventilation, and air conditioning (HVAC) system, e.g. including high-efficiency particulate air (HEPA) filters or off-gas treatment. In some embodiments, the vacuum system for generating a partial vacuum in the containment structure allows a seal to be formed between the surface and the aperture by being arranged to apply a suction force to the external surface that is large enough to temporarily seal the contact surface to the external surface.

It will be appreciated by those skilled in the art that the third aspect and embodiments of the present invention can, and preferably do, include, as appropriate, any one or more or all of the preferred and optional features described herein.

The vacuum system may comprise a vacuum pump for generating the partial vacuum and thus the pressure difference. The vacuum system may also be used to draw any waste produced (and, e.g. released) by the decontamination device (e.g. aerosols) away from the external surface, e.g. into the main body of the containment unit, e.g. into a module for waste collection. The vacuum system may comprise a vacuum hose (e.g. within the (e.g. sealed) working volume) for removing contaminants or contaminated material from the (e.g. sealed) working volume.

In embodiments comprising an inner barrier, the (e.g. inner contact surface of the) decontamination device may be arranged to provide an inner suction barrier (e.g. inner suction seal). The (e.g. inner contact surface of the) decontamination device may be arranged to provide the inner suction barrier (e.g. inner suction seal), e.g. by generating a pressure difference between at least part of the decontamination device and the (e.g. sealed) working volume, in any suitable and desired way. In a set of embodiments, the decontamination device comprises a vacuum system for generating a partial vacuum in the (e.g. contact surface of the) decontamination device, for applying a suction force to the external surface.

The vacuum system of the decontamination device (which may, for example, comprise part of the vacuum system for the containment structure) may comprise a vacuum pump for generating the partial vacuum and thus the pressure difference. The vacuum system may also be used to draw any waste produced (and, e.g., released) by the decontamination device (e.g. aerosols) away from the external surface, e.g. into a module for waste collection. The vacuum system may comprise a vacuum hose (e.g. within the (e.g. hood of the) decontamination device) for removing contaminants or contaminated material from within the inner barrier.

In a set of embodiments, the contact surface (of the containment structure and/or the decontamination device) comprises one or more friction pads. The one or more friction pads preferably comprise a material having a relatively high coefficient of friction (when in contact with the external surface)—e.g. a material having a high surface roughness. Therefore, in such a set of embodiments, the contact surface is arranged to hold the (e.g. hood of the) containment structure to the external surface via the one or more friction pads.

In a set of preferred embodiments, the one or more friction pads extend around at least 80% of the perimeter of the aperture. When a barrier (e.g. seal) is formed by the contact surface on the external surface, the one or more friction pads may help to restrict movement of the decontamination apparatus from its (e.g. sealed) position. Therefore, the one or more friction pads help to achieve a secure 'locking' of position while the barrier (e.g. seal) is in place (e.g. during suction).

The working volume defined by the contact surface allows the decontamination device to access the external surface to be decontaminated through the aperture. Thus preferably the decontamination device is located within the containment structure. The (e.g. sealed) working volume should be large enough to surround the decontamination device. In a set of embodiments, the (e.g. sealed) working volume is large enough to surround the decontamination device and any additional surveying equipment (e.g. a detector or a sensor).

The decontamination device preferably comprises a decontamination tool. Any suitable and desired decontamination tool may be used for removing contaminants, or material comprising contaminants, from the external surface. In a set of embodiments, the decontamination tool comprises one or more of: a (ultra-high pressure (UHP)) hydro-demolition tool; a mechanical scabbling tool; a dry ice blasting tool; a grit blasting tool; a lasering tool; a nitro-jetting tool; a chemical removal tool (e.g. using a chemical reagent) and/or a high pressure water jetting tool. For example, a UHP hydro-demolition remotely operated vehicle may be used for horizontal and vertical scabbling of the external surface.

The skilled person will appreciate that, in some embodiments where aerosols are produced, at least a large proportion (e.g. substantially all) of the contaminants or contaminated material removed from the external surface may be contained within the containment structure. During decontamination (e.g. high pressure waterjetting), contaminants or contaminated material removed from the external surface may become airborne in the external environment—e.g. in aerosol form. Therefore, the (e.g. sealed) working volume helps to prevent the contaminants or the contaminated material released during decontamination, from escaping into the external environment (i.e. the environment external to the containment structure). For example, when using at least preferred embodiments of the invention, contaminated material (e.g. dust) that may become airborne during the removal process may be substantially prevented from re-contaminating the external surface via deposition.

In a set of embodiments, the decontamination device is moveable, e.g. relative to (within) the containment structure. The decontamination device may be operated remotely. In one set of embodiments, the decontamination device is mounted to a remotely operated vehicle. In a set of embodiments the decontamination device is mounted on a floor or wall of the hood, platform or containment structure. In a set of embodiments the decontamination apparatus comprises a frame, on which the (e.g. remotely) controlled decontamination device is (e.g. movably) mounted, e.g. to allow the remotely controlled decontamination device to move along or across the frame—e.g. enabling movement in the x and y directions (e.g. where the external surface extends in the x-y plane). In a set of embodiments, the decontamination device is moveably mounted on one or more rails (or toothed (gear) rack(s)) mounted to a support frame.

The decontamination device works within the (e.g. sealed) working volume to remove contaminants from the external surface to be decontaminated. This is typically achieved by removing a layer of the external surface. In some embodiments, the layer that is removed is the layer which comprises at least 90% of the contaminant (in terms of mass, volume or other measures particular to the contaminant itself (e.g. radioactivity)). In simple terms, a portion (e.g. a layer) of the external surface is shaved off to remove the hazardous or toxic material.

In a set of preferred embodiments, the decontamination device is arranged to excavate or remove a layer of the external surface to at least a threshold depth into the external surface, e.g. from the original level of the external surface. In a set of embodiments, the threshold depth (e.g. of the layer to be removed from the external surface) is between 10 mm and 50 mm—e.g. between 20 mm and 30 mm—e.g. approximately 25 mm. The threshold depth may be set as the depth to which an external surface should be excavated or removed in order to remove a target amount (e.g. at least 50%, e.g. at least 60%, e.g. at least 70%, e.g. at least 80%, e.g. at least 90%, e.g. at least 95%, e.g. at least 99%) of the contamination present in the external surface (in terms of mass, volume or other measures particular to the contaminant itself (e.g. radioactivity)).

The decontamination device may be arranged to move relative to the external surface at a particular speed, e.g. a speed suitable for the excavation or removal of a layer of the surface to at least the threshold depth. In a set of embodiments, the threshold depth (and thus, for example, the particular speed) is determined by how much of the surface (i.e. up to what depth) should be removed in order to remove a significant (or target) proportion of the contaminant (in terms of mass, volume or other measures particular to the contaminant itself (e.g. radioactivity)). This is useful in embodiments where it is possible to determine or predict the depth of penetration into the surface of the contaminants. This may help the decontamination apparatus to remove a sufficient amount of the contaminants and/or the contaminated material—e.g. to reduce the amount and/or intensity of the contaminant present in or on the external surface to safe levels.

In a set of embodiments, the decontamination device is arranged to excavate and/or remove a layer having a depth of between 10% and 15% more than the threshold depth. For example, if the threshold depth is 25 mm, then the decontamination device may remove the first 28 mm of the external surface, helping to ensure that the external surface is thoroughly decontaminated. This has the advantage of allowing for any uncertainties in the determination of the threshold depth to be compensated for, helping to increase the likelihood that the hazard may be sufficiently removed by the decontamination apparatus.

There is a moveable platform for supporting the containment structure. The main body of the moveable platform preferably comprises a flat upper surface (on which the containment structure is mounted). The moveable platform preferably comprises a cuboidal shape. The moveable platform may have a width of between 1 m and 5 m. The moveable platform may have a length between 1 and 5 times its width. The moveable platform may have a width between 3 and 6 times its thickness.

In a set of embodiments, the moveable platform is modular, e.g. formed from a plurality of (e.g. concrete) blocks that are connected together. The platform may be connected to a gangway (e.g. with a ramp and a handrail), for allowing access to the containment structure.

The platform may be moveable in a horizontal direction (i.e. sideways or forward and backwards). In a set of preferred embodiments, the platform is moveable in a vertical direction (i.e. up and down, or in other words, in a direction normal to the plane of the platform).

The platform may be mechanically elevated—e.g. the platform may comprise a mobile elevating work platform. The mechanically elevated platform may comprise or be connected to a scissor lift for mechanically elevating itself. This arrangement may allow translation of the platform in both positive and negative vertical directions.

The platform may be arranged to be moved vertically (up or down) in increments. The platform may be arranged to be moveable such that there may be pauses in between changing the height of the platform, e.g. to give time for horizontal decontamination at the new height. This may allow the decontamination device to have enough time to decontaminate the newly exposed wall before the platform is moved again.

In a preferred set of embodiments, the moveable platform comprises a floating device (e.g. one or more buoy(s) and/or pontoon(s)). Such a platform may be arranged to float—e.g. on water. The floating device may help to keep the platform from sinking. In such a set of embodiments, the external surface to be decontaminated may be the walls and/or floor of a pool or pond.

The moveable platform may be arranged to move with a changing water level. The water level may be changed (e.g. reduced) in increments. In a set of example embodiments, the water level is reduced in increments of between 500 mm and 1000 mm, e.g. between 600 mm and 800 mm, e.g. in approximately 700 mm increments. There may be pauses in between changing the water level to allow time for horizontal decontamination at the new height. In a set of example embodiments, for every 700 mm of water that is removed, the external surface accessible from this level is removed to a depth of 28 mm.

In a set of embodiments, the platform comprises concrete. Where the contamination is radioactive, having a platform comprising concrete provides good radiological shielding for the containment structure. In such embodiments, electronics located within the containment structure are better protected against radiation damage. This may be advantageous if there are sometimes human operators on the platform (e.g. during maintenance), to reduce the dose of radiation received down to safe levels. Furthermore, a platform comprising concrete helps to provide the platform with rigidity and stability (e.g. in comparison with plastic platforms).

In a set of embodiments the containment structure comprises a plurality of apertures and a plurality of contact surfaces arranged around the perimeter of the plurality of apertures respectively (i.e. a contact surface for each aperture). As mentioned above, the portion of the decontamination apparatus extending between the main body of the containment structure and the contact surface (defining the at least one aperture) may be known as a hood. When the containment structure comprises a plurality of apertures and a plurality of contact surfaces, preferably the containment structure comprises a hood for each contact surface. Preferably the containment structure comprises at least one decontamination device arranged to decontaminate the external surface via each hood. Thus preferably the containment structure comprises a plurality of hoods comprising the plurality of contact surfaces respectively, wherein each hood extends between the main body of the containment structure and the respective contact surface.

Having a plurality of hoods and a plurality of decontamination devices may allow the decontamination procedure to be completed more quickly and/or may allow more of the external surface to be accessed. The at least one hood may extend from any surface of the main body of the containment structure—e.g. from below (e.g. the floor) or above (e.g. the roof). In a set of embodiments, one or more of the hood(s) extends from the side (e.g. wall) of the main body of the containment structure. This may provide better access if the external surface to be decontaminated is a wall.

In a set of embodiments, the contact surface comprises one or more hinges. In this way, when the decontamination apparatus is placed proximal to a corner of an external surface, the hinges allow the contact surface to change shape (e.g. as the hood is deployed) to fit into the corner or around an edge to define the (e.g. sealed) working volume. For example, an opening hinge mechanism may allow the outer edges of the contact surface to move backwards (e.g. towards the containment structure) to fit inside a corner and a closing mechanism may allow the outer edges of the contact surface to move forwards to fit around an edge. Such embodiments may help to allow the decontamination of corners and edges which would typically require the dexterity of human workers to manually decontaminate.

In embodiments where the contact surface comprises one or more friction pads, the one or more friction pads may comprise one or more hinges. For example, the one or more friction pads may comprise a series of hinges to allow the contact surface to form a barrier (e.g. seal) on curved surfaces or around corners.

In a set of embodiments, the decontamination apparatus comprises at least one sensor and/or detector for sensing and/or detecting a physical or chemical property associated with a contaminant in or on the external surface. For example, when the contaminant is a gamma-emitting radioactive material, the sensor and/or detector may be a gamma camera (or a spectrometer). Having one or more of these sensors and/or detectors allows the physical or chemical property associated with the contaminant to be detected and, e.g., measured (e.g. the dose rate for radioactive contaminants). In particular, this helps to allow for hotspot identification of the contaminated surface and optionally a periodic assessment of the efficiency of the decontamination technique.

Preferably, the position of the physical or chemical property associated with the contaminant may be determined by the at least one sensor and/or detector. The sensor and/or detector may be arranged to obtain captured measurement data of the physical or chemical property and/or captured video image data. Therefore a (visual) record may be built up of the location and measurements of the physical or chemical property associated with the contaminant. This helps to allow the contaminant to be identified and disposed of correctly by the decontamination apparatus, e.g. from the contaminated environment.

The at least one sensor and/or detector may be mounted on the main body of the containment structure. In a set of embodiments, at least one of the at least one sensors and/or detectors is mounted within the working volume.

In a set of embodiments, the decontamination apparatus comprises a (e.g. sensor and/or detector) feedback system, e.g. arranged to receive the output from the at least one sensor and/or detector. Preferably the (e.g. sensor and/or detector) feedback system comprises a control unit, wherein captured data from the sensor and/or detector is processed by a control unit. This may provide feedback for the decontamination process. For example, the movement of the decontamination device may be controlled based on the measured position and/or intensity of the physical or chemical property associated with the contaminant. This feedback system would reduce the likelihood of the decontamination apparatus 'missing' areas of the external surface.

In a set of embodiments the decontamination apparatus comprises a tracking system—e.g. to enable horizontal movement of the decontamination apparatus and/or the decontamination device. The platform (where provided) is preferably stationary while decontaminating and the (e.g. hood and) decontamination device may be driven horizontally along the external surface (e.g. using a linear tracking system).

The depth of penetration by the decontamination device into the external surface may be controlled by the tracking speed—i.e. where the tracking speed is the speed of movement of the components of the decontamination apparatus and/or the decontamination device. For example, sensors and/or detectors may be arranged to monitor the external surface (e.g. within the (e.g. hood) of the containment structure). Acquired data (e.g. from the one or more sensors/detectors) may be used (e.g. by the control unit) to adjust the tracking speed (e.g. speed of horizontal movement) to achieve the required depth of penetration.

In a set of embodiments, the (e.g. decontamination device of the) decontamination apparatus is remote controlled. It will be appreciated that such embodiments may allow hostile contaminated environments, considered too dangerous for a human to enter (e.g. for long periods), to be decontaminated. For example, in a radioactive environment, a human operator may be exposed to the maximum permitted personal radiation dose in a relatively short period of time, preventing conventional manual decontamination to be performed safely. A remote controlled decontaminated apparatus in accordance with some embodiments of the invention may help to prevent a human operator from being exposed to the contaminants that may be present in or on the external surface.

In one set of embodiments the decontamination apparatus comprises or is in communication with a control room (e.g. remote from the containment structure) for controlling operation of the (e.g. remotely controlled) decontamination apparatus (e.g. the decontamination device(s) in the containment structure, the moveable platform, the sensors/detectors and/or the contact surface). This allows (e.g. human) operators to perform decontamination (e.g. using the (e.g. remotely controlled) decontamination device) away from the decontamination device, thus helping them to avoid exposing themselves to the external surface being decontaminated.

The control room may be located in any suitable or desired location, relative to the containment structure. In one set of embodiments, the control room and containment structure are physically separate. In a set of embodiments, the main body of the containment structure comprises the control room (e.g. as a dedicated control module).

In one embodiment the control room is located remote (i.e. in a different location) from the containment structure. This may be in a different room, a different building, at a different site, in a different geographical location (e.g. city or country), etc.

Preferably the control room comprises a control apparatus for controlling the remotely controlled components of the containment structure. The control apparatus may include readout apparatus, e.g. display screen(s) (e.g. for showing images captured by camera(s) in the containment structure), and/or sensor and/or detector display(s) (e.g. for showing the measurements captured by sensor(s) in the containment structure). This may help to allow any operator(s) in the control room to see and control the remotely controlled decontamination device, contact surface (e.g. hood) and/or moveable platform as appropriate.

The control room may include one or more input control devices, e.g. for actively controlling (e.g. manipulating) the remotely controlled component(s) in the containment structure. For example, the input control devices may include a joystick (or similar operating device, such as a haptic controller) for controlling the (e.g. movement of the) the decontamination device, contact surface (e.g. hood) and/or the moveable platform.

Thus preferably the control room is in data communication with the decontamination apparatus (and, e.g., one or more (e.g. all) of the components of the decontamination apparatus), e.g. the control room is arranged to receive data signals from (e.g. one or more (e.g. all) of the components of) the decontamination apparatus and to transmit data signals to (e.g. one or more (e.g. all) of the components of) the decontamination apparatus. This includes, but is not limited to, the decontamination device, the one or more sensors and/or detectors and the moveable platform. Thus, preferably the control room and/or the decontamination apparatus (e.g. each) comprise one or more (e.g. wired or wireless) data transmitters and/or receivers, as appropriate. The components of the decontamination apparatus may be controlled actively and directly by operator(s) in the control room all the time, e.g. the operator(s) in the control room may have full control of the decontamination apparatus.

In one set of embodiments, the external surface to be decontaminated is first surveyed—e.g. using the one or more sensors. This allows the external surface to be decontaminated to be characterised. The object or structure may then be decontaminated, using the information gathered from its characterisation. This may allow the decontamination process to be at least partly automated.

In one embodiment a model of the external surface to be decontaminated is built, using the captured data. The model may also be used to control one or more (e.g. all) of the decontamination device(s), at least partly automatically. For example, if the location, shape and size (and optionally dose rate per unit area) of the external surface to be decontaminated are known, the components of the decontamination apparatus (e.g. the contact surface, decontamination device, and/or the moveable platform) may be controlled to move automatically between two positions, e.g. based on the distribution of detected contaminants on or in the external surface. For example, feedback from a sensor or detector (e.g. a gamma camera) may be used to control the (movement/tracking) speed of the decontamination tool.

This helps to avoid the operator(s) having to exert continuous control over all components of the decontamination apparatus. However, it may be helpful for the operator(s) to exert at least some control over the components of the decontamination apparatus and their operation not to be fully automated. Thus preferably various camera(s), sensor(s), detector(s), etc., may be arranged to capture their respective data and transmit it to the control room for use by the operator(s) in controlling the operation of components of the decontamination apparatus.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

A significant challenge presented by nuclear power generation, is the safe storage and remediation of radioactive waste. Nuclear fuel pools or ponds provide one way of cooling and storing spent fuel rods. These ponds are filled with water and are typically lined with a thick concrete layer on the walls and floor. They provide immediate "cooling" for long enough so that short-lived isotopes are given time to decay, which reduces the ionising radiation emitted from the rods. The water and concrete provide adequate shielding (e.g. to protect workers at nuclear facilities) until the rods are sent elsewhere for dry storage or reprocessing.

One the most problematic fission products of Uranium-235 (used in fuel rods) is Caesium-137. It is highly water-soluble and has a half-life of approximately 30 years. Radionuclides, such as Caesium-137 and Strontium-90, may be released from the spent fuel rods into the pond water. Over time the water, contaminated with radioisotopes, absorbs into the surface layer of the concrete. This means that even when the spent fuel and water are removed, the remaining pond walls and floor will continue to be contaminated as the radionuclides become trapped within the porous concrete matrix.

When nuclear power facilities close, the spent fuel ponds require their concrete walls and floors to be remediated prior to final decommissioning and demolition. Both the contaminated water and the contaminated concrete should be removed from the site. Removing the contaminated concrete can be dangerous for the environment and the health and safety of nearby workers. Breaking or destroying the concrete, for example by water-jetting, allows the contaminated waste to become airborne and contaminated aerosols may be released into the surrounding environment, particularly for outdoor ponds.

Figure 1:
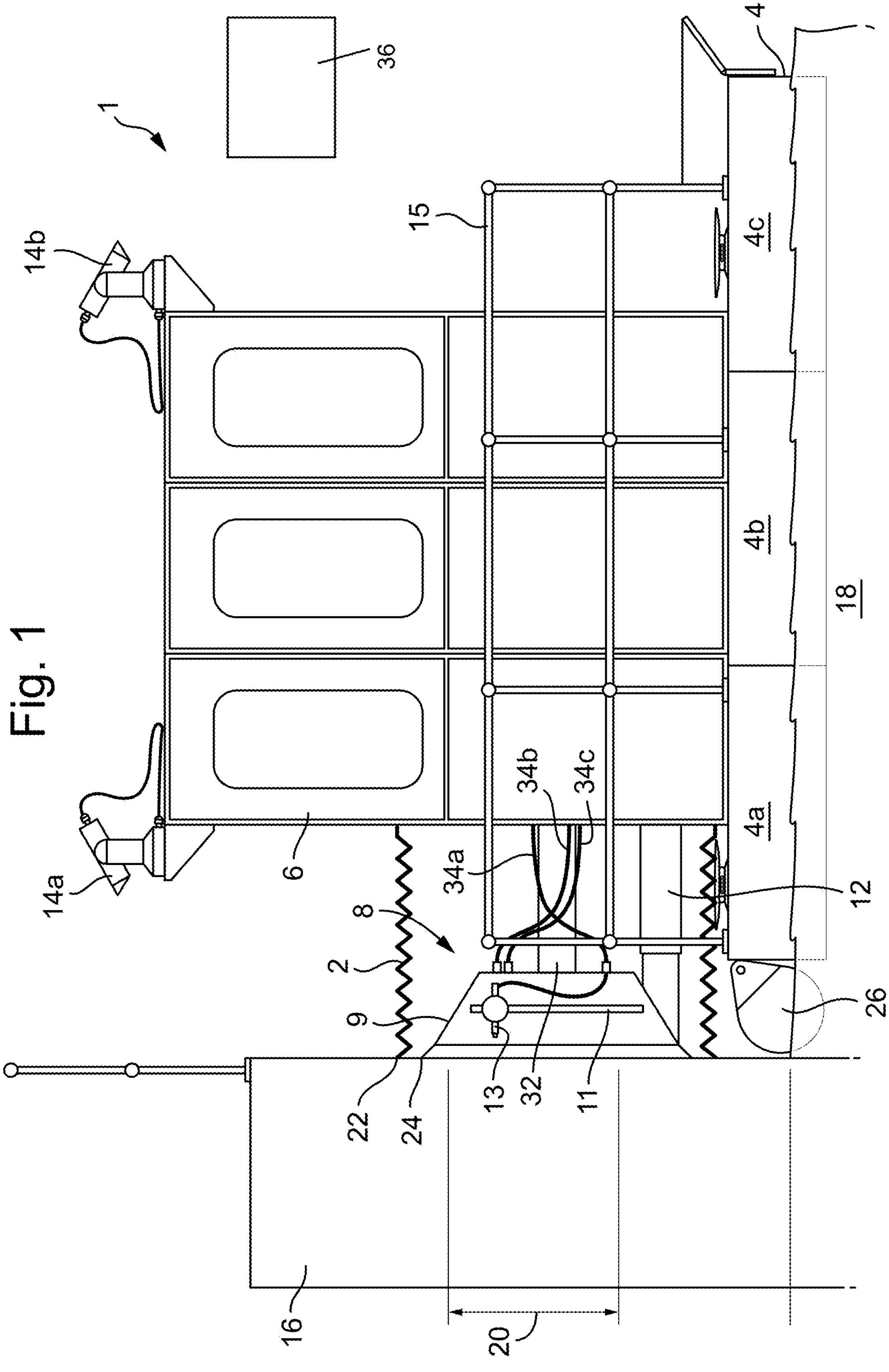
FIG. 1 shows schematically a decontamination apparatus in accordance with an embodiment of the present invention.

FIG. 1 shows schematically a decontamination apparatus 1 in accordance with an embodiment of the present invention. Here, the decontamination apparatus 1 is being used to remove contaminated concrete from the surfaces (e.g. of the walls) of a spent fuel pond. The radiological goal for remediation of such spent fuel ponds is typically to reach R2 radiation zone levels (<25 μSv/hr) at a distance of 1 m. This may be achieved by removing (or in simple terms 'shaving') a layer of the external surface to be decontaminated.

In this embodiment shown in FIG. 1, the decontamination apparatus 1 comprises a containment structure, comprising a main body 6 and a hood 2 (i.e. defined by a corrugated or concertina-like tunnel), a decontamination tool and a platform 4.

The hood 2 of the containment structure is arranged to be brought into contact with a wall 16 of a spent fuel pond (i.e. as shown in FIG. 1), and is supported by the (pontoon) platform 4. The platform 4 has a floating device (e.g. buoys or pontoons) 26 to help it to float on the water 18 and prevent it from colliding with the wall 16. The hood 2 has a contact surface 22 (at the distal end of the hood 2) that surrounds an aperture or hole of the containment structure. Within the hood 2 is a decontamination device 8 and a vacuum hose 12 connected to a vacuum system (not pictured).

A handrail 15 is provided for the safety of any operators or maintenance/repair workers who may need access to the main body 6 of the containment structure. Two gamma cameras 14*a*, 14*b* are mounted to the top of the main body 6 of the containment structure.

For an external surface 16 that is contaminated and needs to be decontaminated, the platform 4 and containment structure is assembled proximal to the external surface 16. It is appreciated that the containment structure could have any number of hoods and decontamination devices. However, here the decontamination apparatus has a single hood 2 and decontamination device 8. The face of the containment structure where the hood 2 and decontamination device 8 are located is arranged to face the external surface 16 to be decontaminated.

The concertina-like hood 2 may initially be folded up, close to the containment structure. On starting the decontamination process, the hood 2 is arranged to be deployed from the side of the main body 6 of the containment structure. Movement of the hood 2 may be remote-controlled—e.g. by a control system in a control room within the main body 6 or a control room 36 remote from the decontamination apparatus 1, 3. Movement or deployment of the hood 2 involves extension of the hood 2, by unfolding, toward the external surface 16 to be decontaminated.

The corrugated nature of the hood 2 allows the hood 2 to bend in a number of directions. The hood 2 may therefore bend toward an external surface if necessary—e.g. the floor of a spent fuel pond. This allows the decontamination apparatus 1 to increase the number of external surfaces that may be decontaminated with a single hood 2 and decontamination device 8.

When the hood 2 has been extended to make contact with the external surface 16, a barrier (e.g. seal) is formed between the contact surface 22 of the hood 2 and the external surface 16. The (suction) barrier (e.g. seal) is generated by a vacuum system (not pictured) being controlled to lower the pressure within the hood 2 via a vacuum hose 12.

The barrier (e.g. the outer barrier (e.g. the outer seal)) provided by the contact surface 22 of the hood 2 defines a (e.g. sealed) working volume within the containment structure, within which sits a decontamination device 8. The decontamination process is performed on the external surface 16 by operating the decontamination device 8 within this working volume.

The decontamination device 8 comprises a cover 9 having an inner contact surface 24 to provide an inner barrier, in addition to the outer barrier provided by the outer contact surface 22 of the hood 2. This further helps to prevent the release of waste into the surrounding environment. For example, the inner barrier (e.g. inner seal) may prevent the release of more solid/aggregate waste and the outer barrier (e.g. outer seal) may prevent the release of more of the aerosol waste.

The components (e.g. the hood 2, decontamination device 8, gamma cameras 14*a*, 14*b*) of the decontamination apparatus 1, 3 may be connected to a control system over one or more wired or wireless links. The operation of the decontamination device 8 is controlled via control lines 34*a*, 34*b*, 34*c*.

Figure 4B:
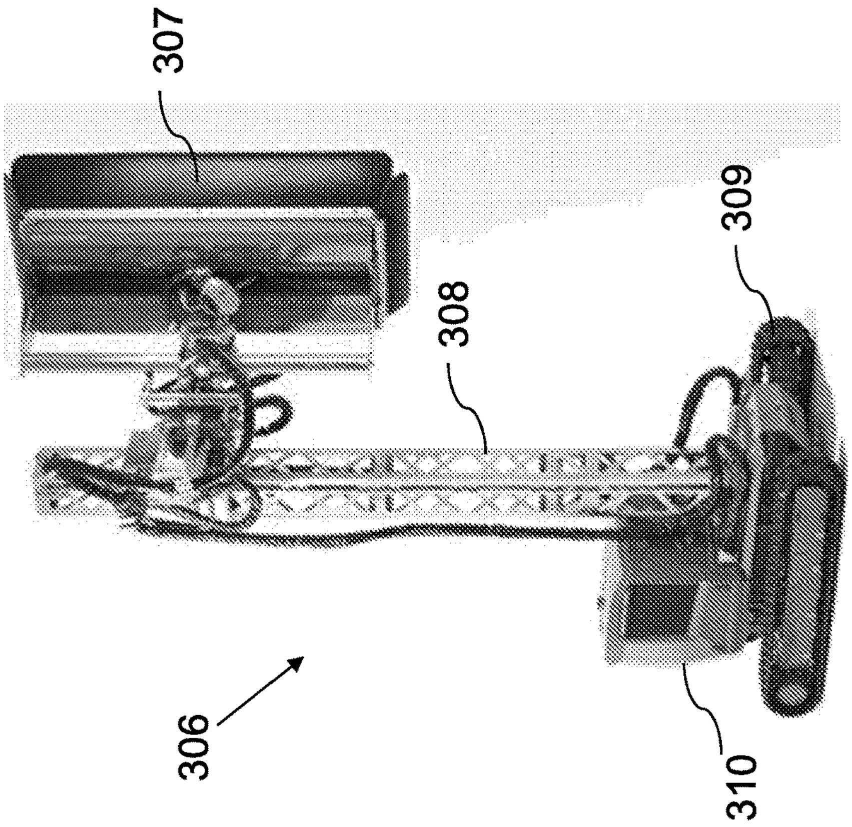
FIG. 4A and FIG. 4B show examples of decontamination devices for use with embodiments of the present invention.
Figure 4A:
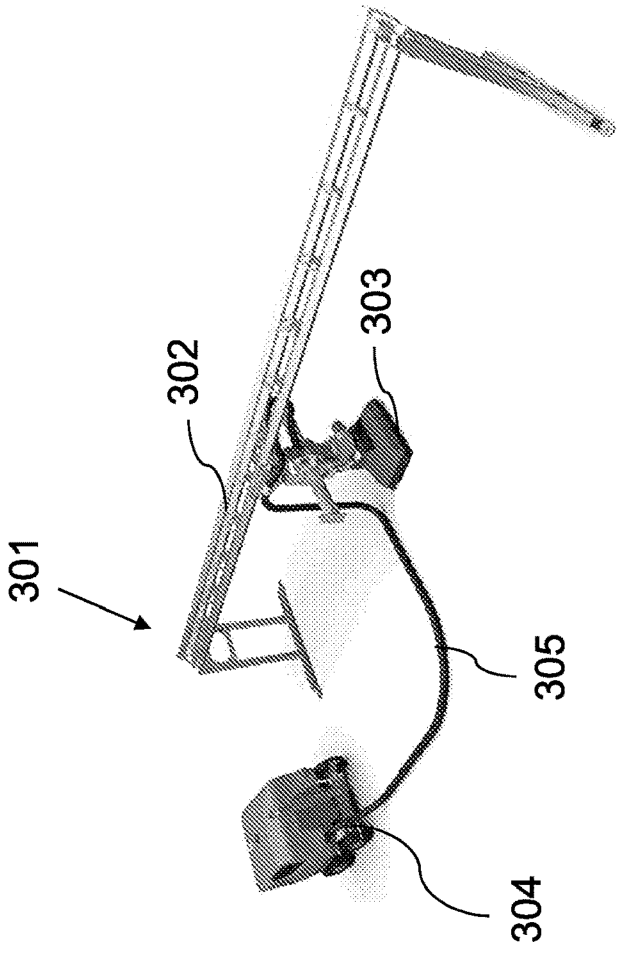

A support member 32 is used to mount the decontamination device 8 to the containment structure's main body 6, e.g. via a frame 302, 308 as shown in FIG. 4A or 4B. The support member 32 may be retractable or static and may comprise a vacuum hose (in addition to the main vacuum hose 12) for removing waste from within the decontamination device's cover 9. It can be seen that one of the control lines 34*a* connects to a decontamination tool 13 on a frame 11. The tool 13 is slidably mounted to the frame 11. The frame 11 provides a mechanism for moving the tool (e.g. horizontally and vertically) within the cover 9.

The vacuum hose 12 is arranged to remove aerosols from within the (e.g. sealed) working environment and transport them a short distance (e.g. between 0 m and 10 m—e.g. between 0.1 m and 5 m) to the main body 6 of the containment structure. This helps to prevent problems caused by transporting aerosols along long lengths of hoses—e.g. a build-up of dust may cause blockages in a longer hose.

The hood 2 (having a contact surface 22 forming the outer barrier) captures aerosols created by the decontamination (e.g. jetting) process. In this example, there is a separate vacuum system for the hood 2 and for the decontamination device 8. The vacuum system provided for the hood 2 creates a draw for the aerosol, and provides a barrier (e.g. seal) (and nominal adhesion) between the hood 2 and the external surface 16 (pond wall).

Where the external surface 16 is a spent fuel pond wall (as in FIG. 1), the pond water may be removed incrementally during the decontamination process. This advantageously allows the water to continue to provide some shielding during decontamination.

The pond water 18 is incrementally removed (e.g. via a pump—not pictured) and the water level is consequently lowered in increments, e.g. 700 mm at a time. As the water is lowered by a certain distance (e.g. 700 mm) 20, the floating platform 4 is automatically lowered the same distance 20. After the water has been reduced by a certain distance, e.g. by 700 mm, the decontamination device 8 is again moved into contact with to the external surface 16 and the decontamination tool within the cover 9 works to remove a layer of the external surface 16.

While the decontamination tool works on the external surface, no water is removed from the pond and the platform 4 stays at a constant level. This gives the decontamination device 8 enough time to work horizontally (or in two directions—e.g. horizontally and vertically) to remove a layer of the external surface within the working volume, e.g. up to a depth of 28 mm.

A jet of high-pressure water may be used to abrade concrete fines and aggregate—e.g. without damaging reinforcing bars or other cast-in steel items in the external surface (pond wall) 16. A high flow rate vacuum system captures and removes the water and solids from the work surface—e.g. via the vacuum hose 12 within the hood 2 or another vacuum hose located within the cover 9 of the decontamination device 8 (e.g. within the support member 32).

During decontamination, a layer of the external surface (e.g. to a depth of approximately 28 mm) may be removed from the external surface 16 by the decontamination device 8. This may involve the use of a shaving method—e.g. by an ultra-high pressure hydro-demolition remotely operated vehicle.

Approximately 99% of radioactive Caesium is in the first 25 mm of the external surface of a spent fuel pond. By removing up to 28 mm of the external surface, the hazard may be removed to a safe level.

The containment structure may be modular and, in some examples, a module for waste (solids) collection may be housed in the modular containment structure's main body 6. Water treatment systems may also be contained within the main body 6 so that pH neutral water may be routed back into the pond.

The decontamination tool 13 or device 8 and/or surrounding hood 2 may be driven horizontally along the external surface 16 using a linear tracking system (e.g. at a certain tracking speed). The depth of penetration into the external surface 16 by the decontamination tool 13 or device 8 may be controlled by the tracking speed (i.e. the movement of these components). This may be controlled remotely and/or automatically based on captured data. For example, the plastic scintillator radiation (gamma) detectors 14*a*, 14*b* may monitor the scabbled wall behind the hood 2. Radiometric data may be collected and related to the position of the jetting operations and may be used to generate a dose map of the external surface (e.g. pond wall) 16.

The gamma cameras 14*a*, 14*b* may monitor the external surface (e.g. behind the hood 2) and this data can be used to adjust the tracking speed (e.g. speed of horizontal movement of the decontamination device) to achieve the required depth of penetration into the external surface 16. The gamma cameras 14*a*, 14*b* may alternatively be located within the hood 2 or even within the cover 9 of the decontamination device 8.

Figure 2:
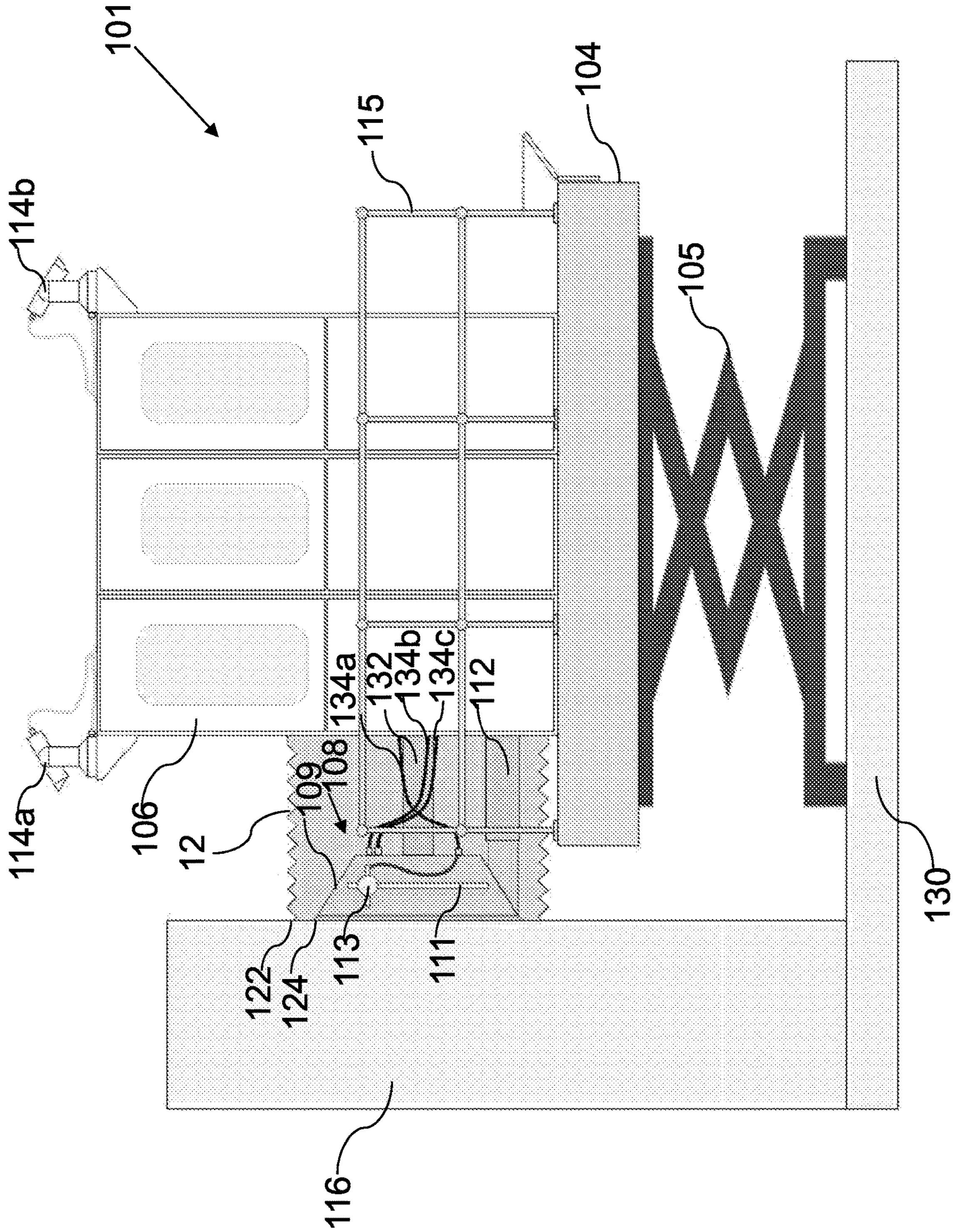
FIG. 2 shows schematically a decontamination apparatus in accordance with another embodiment of the present invention.

FIG. 2 schematically shows another embodiment of the decontamination apparatus. FIG. 2 has substantially all the features of FIG. 1. The difference between the decontamination apparatus 101 shown in FIG. 2 and the embodiment shown in FIG. 1 is that the floating pontoon platform 4 has been replaced by a mechanically moveable platform 104. Supporting the platform 104 is a scissor lift 105 which is mounted to the floor 130.

In FIG. 2, the pond is dry (e.g. already dewatered) and the moveable platform support (scissor lift) 105 is mounted on the pond floor 130. The moveable platform support 105 allows for vertical movement of the platform 104. The platform 104 may be modular (as shown in FIG. 1), however, in this example, the platform 104 is comprised of one solid block of concrete. The thick concrete platform provides radiological shielding for devices/electronics and potential operator(s) above the platform or within the containment structure.

The decontamination apparatus 101 shown in FIG. 2, is useful for decontaminating external surfaces (e.g. 116) where there is no water for the platform to float on, for example, for decontaminating walls or floors of a building or drained spent fuel ponds.

Figure 3:
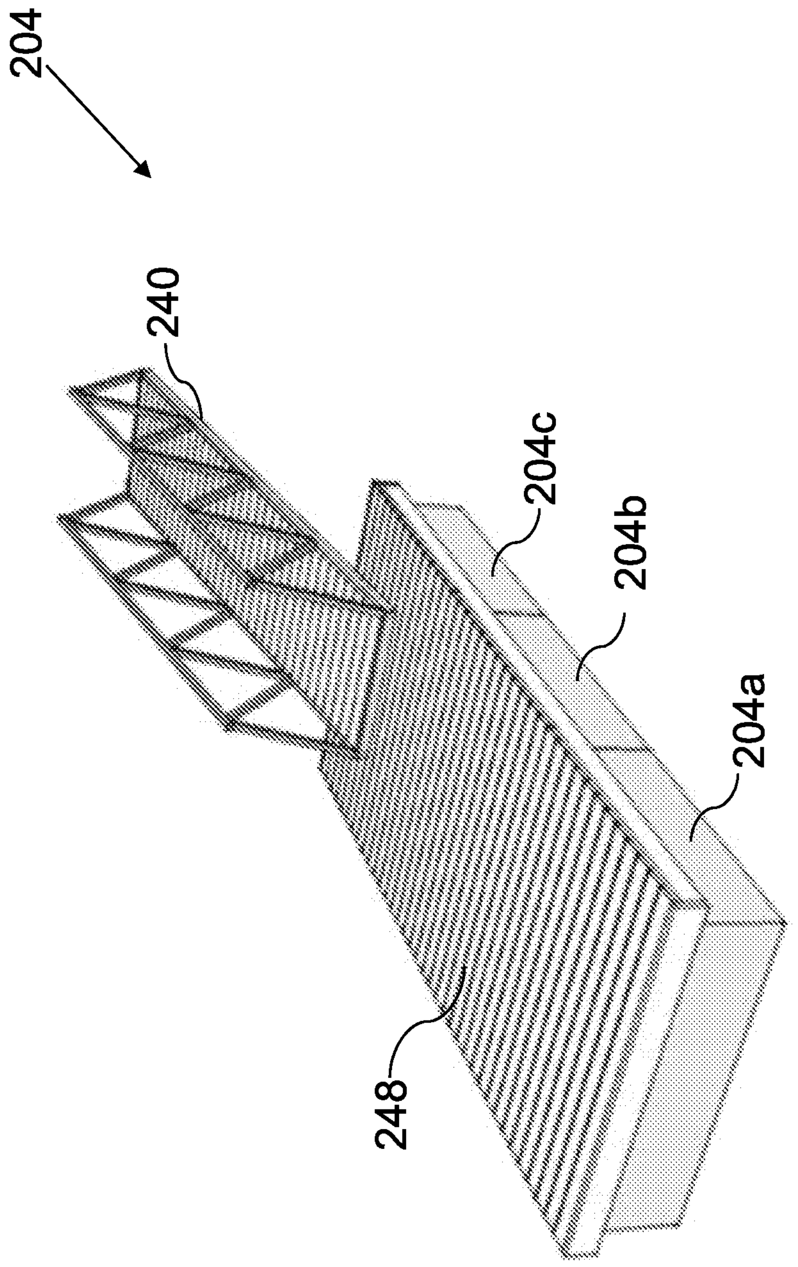
FIG. 3 shows schematically an example of a platform for use with embodiments of the present invention.

FIG. 3 shows schematically a platform that may be used with embodiments shown in FIGS. 1 and 2. In FIG. 3, the platform 204 is modular and comprises three concrete blocks 204*a*, 204*b*, 204*c*. A gangway 240 (ramp) is provided to allow access to the platform 204. This is useful particularly when the external surface is a pond wall (e.g. 16, 116), as the platform 204 may otherwise be difficult to access. A grooved layer 248 on top of the platform 204 and gangway 240 prevents them from being slippery when walked on.

FIGS. 4A and 4B show decontamination devices which may be used in the decontamination apparatus shown in FIGS. 1 and 2.

In FIG. 4A, the decontamination device 301 comprises a cover 303. The cover 303 surrounds the decontamination tool (not shown) and is slidably mounted to a frame 302. In operation, the cover 303 (and decontamination tool within) is held against an external surface to be decontaminated (within the containment structure of the decontamination apparatus of FIG. 1 or 2).

The tool and cover 303 may be translated along the frame 302 (e.g. either horizontally or vertically) at a speed determined by a tracking system. The tracking system may change the speed of the tool based on the depth of external surface that must be removed. This speed may also depend on the decontamination technique used. In this example, the decontamination device 301 is arranged to use the technique of robotic hydro-demolition where the tool comprises a water jet. The water is delivered through the hose 305 to be released from the tool at very high pressures/flow rates.

The decontamination device 306 shown in FIG. 4B is another example of a decontamination (e.g. robotic hydro-demolition) device. In contrast to the decontamination device 301 shown in FIG. 4A, the decontamination device 306 of FIG. 4B allows for both horizontal and vertical movement.

For example, the horizontal movement of the whole device 306 (including the decontamination tool and its surrounding cover 307) is achieved by moving a vehicle 310 on which the decontamination tool is mounted. The vehicle 310 has a motorised continuous track 309. The continuous track 309 increases the footprint size and therefore the stability of the decontamination device 306. The vertical movement of the decontamination tool and its surrounding cover 307 is achieved by moving the tool and cover 307 along the frame 308 to which it is slidably mounted.

Preferably, an ultra-high pressure dry-hydro-scabbling tool is used to perform the decontamination. Such ultra-high pressure (e.g. greater than 3000 bar) pump systems are advantageous as they use a fraction of the water volume used by conventional hydro-demolition systems.

Figure 5:
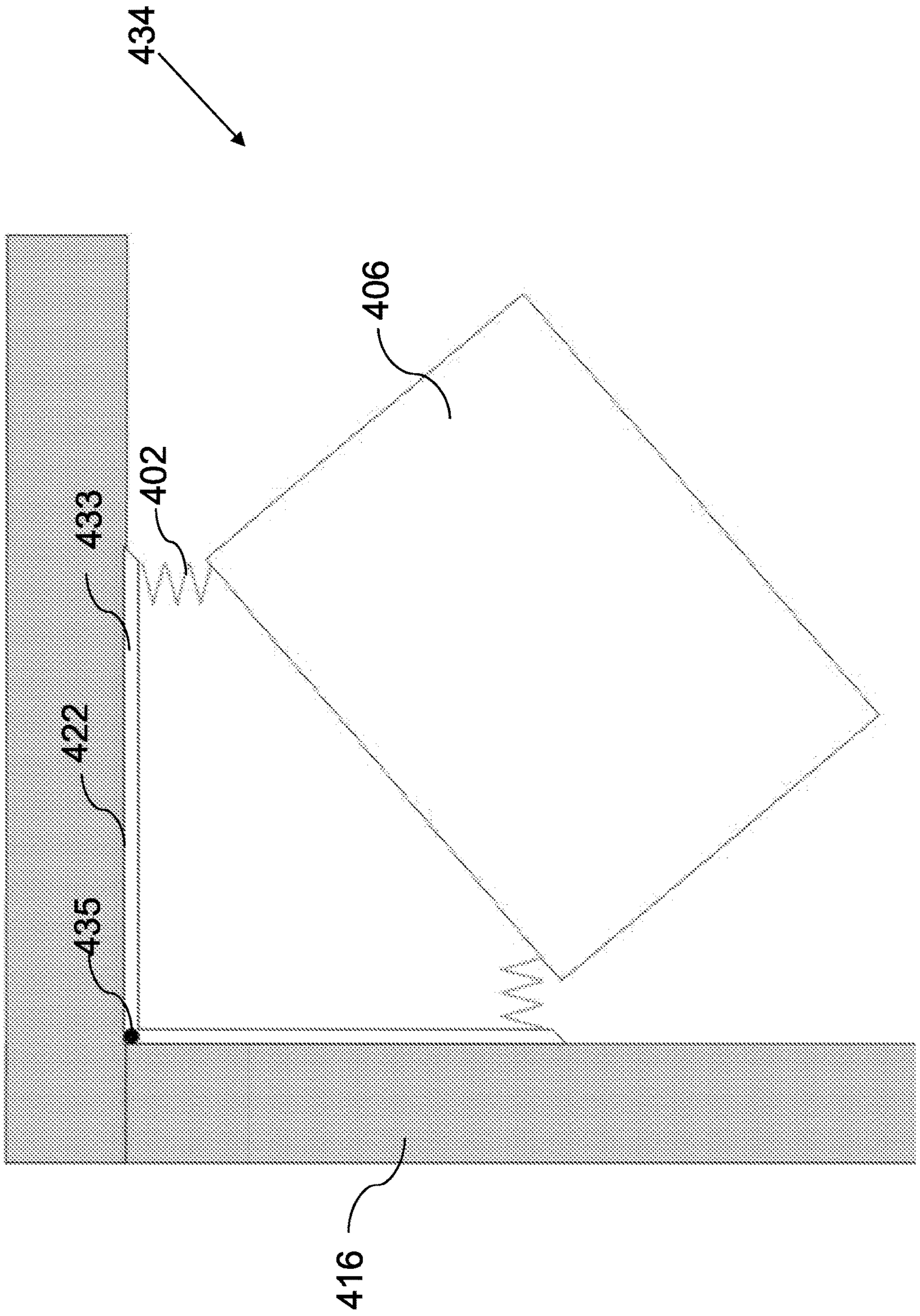
FIG. 5 shows schematically a decontamination apparatus in accordance with an embodiment of the present invention having a hinged arrangement for fitting into a corner.

FIG. 5 shows a simplified schematic of a further embodiment of the present invention, in which the contact surface 422 of the hood 402 comprises a friction pad 433 and a hinge mechanism 435. The decontamination apparatus 434 shown in FIG. 5, is shown with the hood 402 connected to the main body 406 of the containment structure. In this example, the external surface 416 to be decontaminated includes a corner. The hinge mechanism 435 of the friction pad 433 allows the flexible contact surface 422 to be manipulated into the shape required for providing a barrier (e.g. seal).

The addition of a hinged friction pad 433 at the contact surface allows the hood 402 to fit within the corner of the external surface 416 (pond wall) and helps to ensure that the contact surface 422 forms a secure barrier (e.g. seal). The decontamination apparatus of FIG. 1 or 2 may include a contact surface as shown in FIG. 5.

The waste produced from typical decontamination techniques (e.g. water jetting and scabbling), is often highly contaminated. Existing decontamination techniques typically result in considerable aerosol effluence and without the barrier (e.g. seal) provided by the decontamination apparatus described herein, would release highly contaminated airborne waste into the surrounding environment. This would cause recontamination of the surfaces that are being decontaminated and would also spread toxic or hazardous contaminants around the local environment.

Embodiments of the present invention address at least some of the issues described above. Such issues are especially associated with dry decontamination techniques—e.g. namely the generation of airborne dust (or aerosols) and the transportation of the dust via long lengths of hose. Further, the decontamination apparatus according to the invention provides additional shielding and protection from the contaminants.

It will be appreciated by those skilled in the art that although the invention has been illustrated by describing embodiments in relation to decontaminating the walls and floors of spent fuel ponds which may be contaminated with radioactive materials, it is not limited to these embodiments, and the invention can be used in any other suitable context—e.g. for surfaces contaminated with toxic chemicals, asbestos, biologically active materials and hazardous waste. Furthermore, many variations and modifications are possible, within the scope of the accompanying claims.

The invention claimed is:

1. A decontamination apparatus for decontaminating an external surface comprising:

a moveable platform;

a containment structure mounted on the moveable platform;

wherein the containment structure comprises:

at least one aperture; and a respective contact surface arranged around the perimeter of the at least one aperture;

wherein the contact surface is arranged to make contact with the external surface to define a working volume, when the containment structure is positioned proximal to an external surface; and wherein the contact surface comprises one or more hinges; and a decontamination device arranged to decontaminate the external surface, wherein the decontamination device is arranged within the working volume and arranged to access the external surface through the at least one aperture; and a vacuum system for generating a partial vacuum in the containment structure arranged to apply a suction force to the external surface.

2. The decontamination apparatus as claimed in claim 1, wherein the contact surface is substantially continuous around the aperture.

3. The decontamination apparatus as claimed in claim 1, wherein the contact surface is flexible.

4. The decontamination apparatus as claimed in claim 1, wherein the containment structure comprises a hood that extends towards the contact surface; and wherein the hood comprises one or more walls having a concertina shape.

5. The decontamination apparatus as claimed in claim 4, wherein the hood is arranged to rotate the contact surface between a first plane and a second plane, wherein the first plane is not parallel to the second plane.

6. The decontamination apparatus as claimed in claim 1, wherein the vacuum system provides a suction barrier and/or a draw for the waste produced by the decontamination of the external surface.

7. The decontamination apparatus as claimed in claim 1, wherein the contact surface comprises one or more friction pads; and wherein the contact surface is arranged to hold the containment structure to the external surface via the one or more friction pads.

8. The decontamination apparatus as claimed in claim 1, wherein the moveable platform comprises a floating device.

9. The decontamination apparatus as claimed in claim 1, wherein the containment structure comprises a hatch or door to allow access to waste produced by the decontamination of the external surface.

10. The decontamination apparatus as claimed in claim 1, wherein the containment structure comprises a main body connected to the contact surface; and wherein the main body of the containment structure comprises a module for occupation by a human operator comprising shielding.

11. The decontamination apparatus as claimed in claim 1, wherein the decontamination device comprises a decontamination tool comprising one or more of: an ultra-high pressure hydro-demolition tool, a mechanical scabbling tool, a dry ice blasting tool, a grit blasting tool, a lasering tool, a nitro-jetting tool, a chemical removal tool and a high pressure water jetting tool.

12. The decontamination apparatus as claimed in claim 1, wherein the decontamination device is moveable relative to the containment structure.

13. The decontamination apparatus as claimed in claim 1, wherein the decontamination apparatus comprises a frame on which the decontamination device is mounted.

14. The decontamination apparatus as claimed in claim 1, wherein the decontamination device is arranged to excavate or remove a layer of the external surface to at least a threshold depth into the external surface.

15. The decontamination apparatus as claimed in claim 1, wherein the decontamination apparatus comprises a plurality of contact surfaces and a plurality of hoods comprising the plurality of contact surfaces respectively, wherein each hood extends between a main body of the containment structure and the respective contact surface.

16. The decontamination apparatus as claimed in claim 1, wherein the decontamination apparatus comprises at least one sensor and/or detector for sensing and/or detecting a physical or chemical property associated with a contaminant in or on the external surface; and wherein the decontamination apparatus comprises a sensor and/or detector feedback system.

17. The decontamination apparatus as claimed in claim 1, wherein the decontamination apparatus comprises or is in communication with a control room for controlling operation of the decontamination device in the containment structure; and wherein the control room comprises control apparatus for controlling the components of the containment structure.

18. A decontamination apparatus for decontaminating an external surface comprising:

a moveable platform;

a containment structure mounted on the moveable platform;

wherein the containment structure comprises:

at least one aperture; and a respective contact surface arranged around the perimeter of the at least one aperture, wherein the contact surface is arranged to form a barrier with the external surface to define a working volume, when the containment structure is positioned proximal to an external surface; and wherein the contact surface comprises one or more hinges; and a decontamination device arranged to decontaminate the external surface, wherein the decontamination device is arranged within the working volume and arranged to access the external surface through the at least one aperture.

19. A decontamination apparatus for decontaminating an external surface comprising:

a containment structure, the containment structure comprising:

at least one outer aperture; and a respective outer contact surface arranged around the perimeter of the at least one outer aperture;

wherein the outer contact surface is arranged to form an outer barrier with the external surface to define a working volume, when the containment structure is positioned proximal to an external surface; and wherein the outer contact surface comprises one or more hinges; and a decontamination device arranged to decontaminate the external surface, wherein the decontamination device is arranged within the working volume and arranged to access the external surface through the outer aperture, wherein the decontamination device comprises an inner aperture and an inner contact surface arranged around the perimeter of the inner aperture, wherein the inner contact surface is arranged to form an inner barrier between the external surface and the decontamination device, wherein the decontamination device comprises a decontamination tool, and wherein the decontamination tool is arranged to access the external surface through the inner aperture.

* * * * *